United States Patent [19]

Siemon et al.

[11] Patent Number: 5,178,554
[45] Date of Patent: * Jan. 12, 1993

[54] MODULAR JACK PATCHING DEVICE

[75] Inventors: John A. Siemon, Woodbury; Michael A. Cantor, West Hartford, both of Conn.

[73] Assignee: The Siemon Company, Watertown, Conn.

[*] Notice: The portion of the term of this patent subsequent to Dec. 24, 2008 has been disclaimed.

[21] Appl. No.: 740,393

[22] Filed: Aug. 5, 1991

Related U.S. Application Data

[63] Continuation-in-part of Ser. No. 604,770, Oct. 26, 1990, Pat. No. 5,074,801.

[51] Int. Cl.$^5$ ............................................. H01R 13/70
[52] U.S. Cl. ................................. 439/188; 200/51.1; 439/557; 439/676
[58] Field of Search ........................ 439/43, 49, 52, 53, 439/76, 188, 176, 676, 554, 557; 379/325–329; 200/51.1

[56] References Cited

U.S. PATENT DOCUMENTS

| | | | |
|---|---|---|---|
| 4,274,691 | 6/1981 | Abernathy et al. | 439/188 |
| 4,678,251 | 7/1987 | Willard | 379/328 |
| 4,712,232 | 12/1987 | Rodgers | 379/325 |
| 4,773,867 | 9/1988 | Keller et al. | 439/49 |
| 4,829,564 | 5/1989 | Jarvis | 379/327 |
| 4,863,393 | 9/1989 | Ward | 439/188 |
| 4,944,698 | 7/1990 | Siemon et al. | 439/676 |
| 4,959,018 | 9/1990 | Yamamoto et al. | 439/205 |
| 5,074,801 | 12/1991 | Siemon | 439/188 |

Primary Examiner—Neil Abrams
Attorney, Agent, or Firm—Fishman, Dionne & Cantor

[57] ABSTRACT

A novel patching device comprises discrete modules, each having a unitary molded housing which incorporates a pair of standard female modular jacks on a front face thereof. A rear face of the housing includes retaining means for retaining a printed circuit board having circuitry associated therewith which normally maintains a constant electrical interconnection between respective conductive pins in each of the jacks. This normally constant interconnection is interrupted or "preempted" when a known and standard modular plug is inserted into a jack whereby the resilient conductive pins are urged outwardly from contact with the printed circuit board. Each discrete module includes novel snap fitting means which permits disengageable snap fit attachment to an opening of a panel. Significantly, the module may be snap fit either from the front or opposed rear planar surface of the panel.

43 Claims, 15 Drawing Sheets

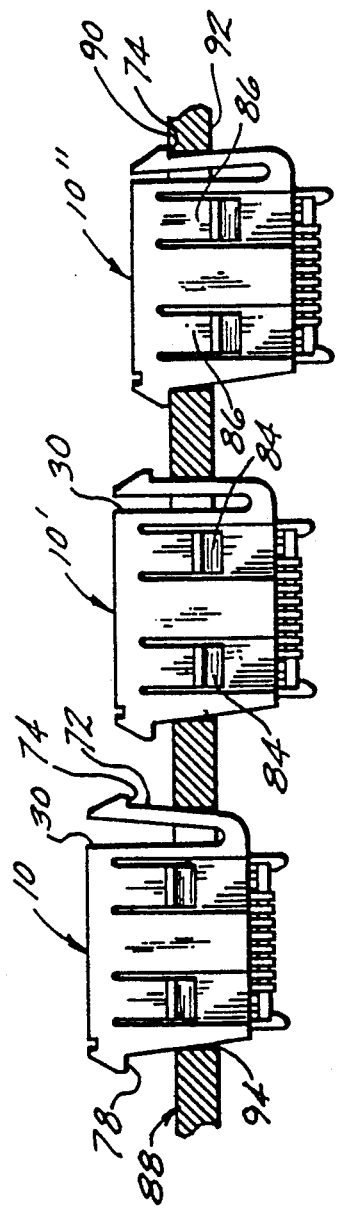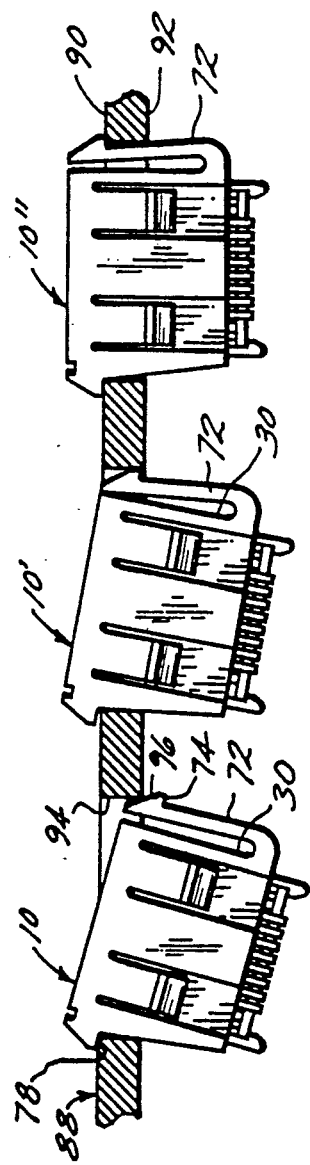

MODULAR JACK PATCHING DEVICE

CROSS-REFERENCE TO RELATED APPLICATION

This application is a continuation-in-part of application Ser. No. 604,770, filed Oct. 26, 1991, now U.S. Pat. No. 5,074,801.

BACKGROUND OF THE INVENTION

This invention relates generally to patching devices for use in the telecommunications field. More particularly, this invention relates to devices for accessing, monitoring, testing and patching of telecommunication circuits wherein the devices comprise discrete preemptive patching modules which are easily snap fit onto a suitable panel.

Modular jack distribution systems allow standard 25 pair (50 pin) telephone connectors (Telco) cabeling systems to be redistributed for multiple modular jack access. These devices allow efficient break-out, interconnection and patching for modems, terminals, CPU's and the like. In particular, panel systems of this type provide quick and efficient means for monitoring, isolating, testing and patching of four, six and eight wire communications circuits.

Patching devices for telecommunications signalling applications have been in use for many years. The earliest widespread use of patch connectors for signalling circuits consisted of "Bantam" jack fields: plugs with a single probe element consisting of a series of aligned but electrically isolated cylindrical conductors designed to mate with appropriately spaced contact spring fingers in a female receptacle with a circular opening. The receptacle spring fingers are configured many ways including those with switchable connections activated by the insertion of the cylindrical plug. Electrical schematics for various prior art Bantam jack configurations are described in "DSX Digital Signal Cross-Connect", Catalogue No. 218 9/86, pp. 54–55 published by ADC Telecommunications, Minneapolis, Minn. Although Bantam jacks are still in use for signal applications between telephone company central office facilities, their cost and physical limitations with respect to ease of cable and patch cord terminations (wrapped wire and solder terminals) and a maximum of only two switchable connection points per connector have inhibited their acceptance and use for commercial and industrial wiring applications. Also, because temporary shorts occur between tip and ring conductors as the plug is inserted, Bantam connectors present an electrical hazard to some types of voltage sensitive equipment. Instead, the connector of choice for administering patching functions for private data and voice communications networks operating over unshielded twisted pair wiring are the well known modular jack connectors used for residential and commercial telephone outlets.

Installations with modular jack patching are most commonly comprised of two sets of patch panels; one set wired directly to equipment or backbone cables which service broad areas of the network and another set connected to horizontal wiring (individual cables extending to each work area outlet). Connections between horizontal wiring and the network equipment are made via patch cords that bridge the two sets of jack fields. Although this wiring scheme is one of the most common methods for accessing, monitoring, testing and patching unshielded twisted pair telecommunications circuits, it has several disadvantages with respect to cost, ease of use and appearance. First, because this method requires two physically separate jack fields, the user is forced to purchase two separate jack connectors and a patch cord along with associated wire termination and mounting hardware for each active node (network access point). Second, the requirement of a patch cord for each node leads to problems with wire management, transmission integrity and the administration of adds, moves and changes. For example, provisions must be taken into account for the physical loading and space requirements of the many patch cords required for large commercial installations. Administration ease is further reduced by large numbers of patch cords because they inhibit the ability to trace port to port connections and obscure circuit identification markings on the front surface of the patch panels.

In addition, the appearance of conventional patch field installations often lacks any semblance of order or organization due to the quantity of cords required for a completed installation. When network moves or changes are made, incidental contact with other patch cords can cause movement of jack/plug connections which degrade transmission integrity.

One other limitation of the prior art modular jack based patching method is that there is no inherent physical relation between the input and output jacks. The physical separation of the two jack fields restricts the ability to modify patch hardware to include application specific wiring or circuitry between input and output jacks that may facilitate installation and functional adaptations that often accompany advanced networking installations such as ISDN. Bantam jack schematics shown in the above-referenced ADC Telecommunications catalogue are examples of application specific jack configurations, many of which require circuit elements and switching features that extend beyond the capabilities of conventional modular jack patch panels.

The present invention utilizes a method for reversibly interrupting patched connections between contact elements similar to prior art jack designs with internally bussed contact positions. A good example of such a device is a standard modular jack interface known in the industry as a type RJ31X modular jack which, when unmated, provides bridged connections between jack positions 1 and 4 and positions 5 and 8. When a standard modular plug is mated with the jack, the aforementioned bridged connections are reversibly interrupted. An illustration of this type of bussed jack arrangement is shown in U.S. Pat. No. 4,944,698 assigned to the assignee hereof. A major limitation of this type of prior art jack configuration is that there is no allowance for the use of intrajack bridging elements for interruptable interjack circuit schemes that permit independent access to bridged jack contact elements. Nor do they allow for the introduction of circuit elements in series or in parallel with bridged (or patched) connections.

SUMMARY OF THE INVENTION

The above-discussed and other problems and deficiencies of the prior art are overcome or alleviated by the patching device of the present invention. In accordance with the present invention, a novel patching device comprises at least two discrete modules, each having a unitary molded housing which incorporates a pair of oppositely disposed (e.g., back-to-back) standard female modular jacks on a front face thereof. Alternatively, a unitary molded housing is configured to incorporate a pair of adjacently disposed (e.g., side-by-side) standard female modular jacks on a front face thereof. In yet another alternative embodiment, the female module jacks are disposed at an angle (preferably 90 degrees) with respect to each other. A rear face of the housing includes retaining means for retaining a printed circuit board having circuitry associated therewith which normally maintains a constant electrical interconnection between respective conductive pins in each of the jacks. This normally constant interconnection is interrupted or "pre-empted" when a known and standard modular plug is inserted into a jack whereby the resilient conductive pins are urged outwardly from contact with the printed circuit board. The module of this invention may sometimes be referred to as a "dual pre-emptive jack" or "cordless patch" module.

Preferably, the exposed conductive pins and circuit board (on the rear face of the housing) are protected by a snap-on cover.

Still another embodiment of this invention utilizes greater than two modular jacks. For example, an eight position modular jack may be selectively interconnected with two four position modular jacks; with all three of the jacks being arranged about a common circuit board (preferably 90 degrees apart).

Each discrete module includes novel snap fitting means which permits disengageable snap fit attachment to an opening of a panel. Significantly, the module may be snap fit either from the front or opposed rear planar surface of the panel.

The patch device of the present invention has many important features and advantages. For example, the side-to-side orientation of the female jacks in the one piece housing of the module allows for a short, data worthy transmission path between jacks via printed circuitry on the circuit board. Also, all of the shunt circuitry associated with the internal patch connections is disconnected on plug insertion for an optimum data path in the mated state. Other advantages of the present invention include provisions for alternate printed circuit designs to accommodate integral circuit elements, and alternate connection and switching schemes for special network applications as well as an embodiment that allows for replacement of the insulated wire insert leads with tails to allow for monitoring one or more fully assembled modules on a printed circuit board. The panel of this invention allows for mounting either 25 pair telco connectors or insulation displacement connecting (IDC) blocks or both to accommodate connecting patch modules to different equipment or cables.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several figures:

FIG. 11 is an end elevation view, partly in cross-section, sequentially depicting the module of FIG. 1 being snap-fit from the front side of the panel;

FIG. 12 is an end elevation view, partly in cross-section, sequentially depicting the module of FIG. 1 being snap-fit onto a panel from the rear side of the panel;

Figure 1:
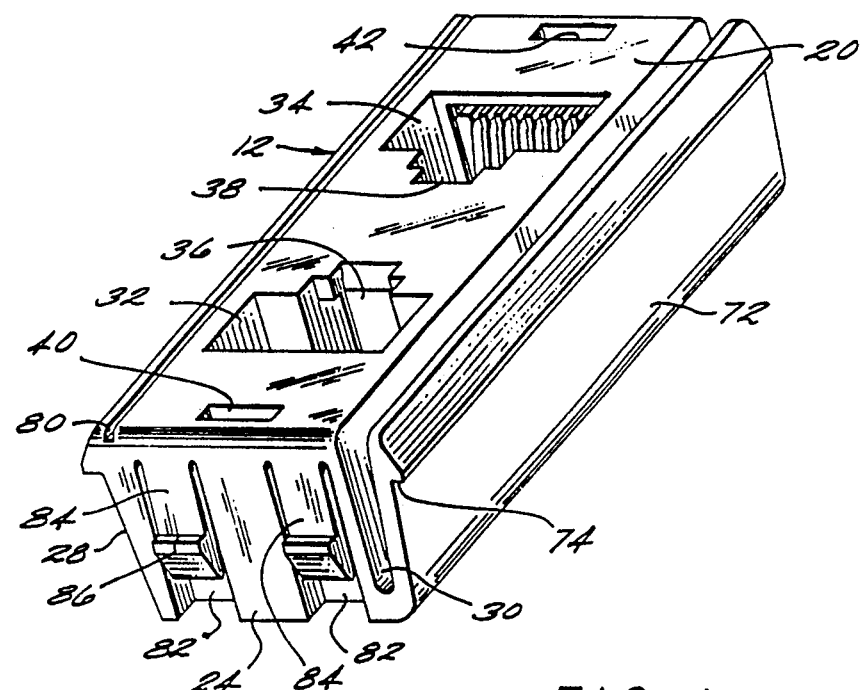
FIG. 1 is a front isometric view of a dual pre-emptive jack module (shown without wire leads) in accordance with the present invention.
Figure 2:
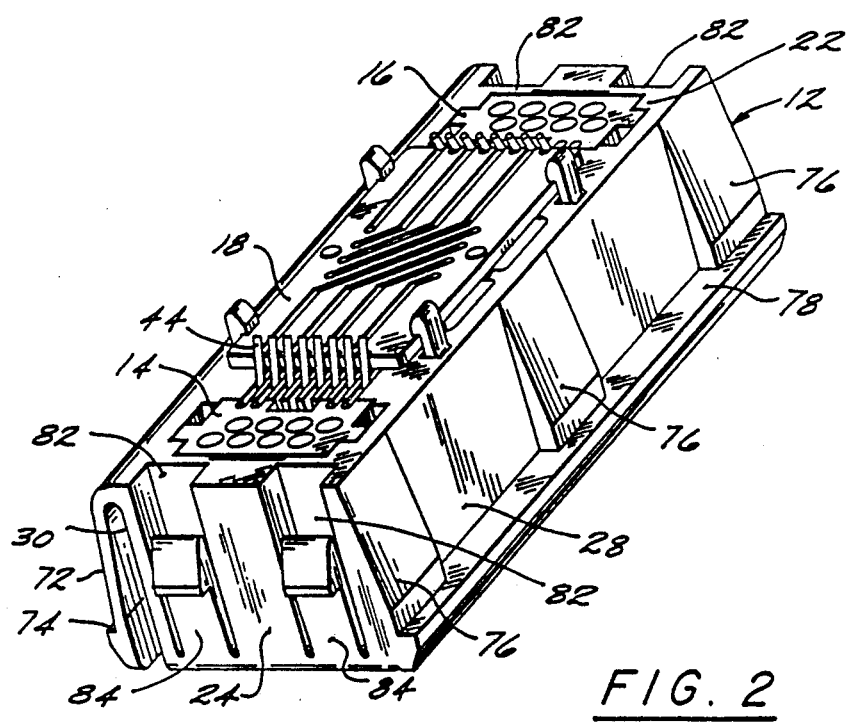
FIG. 2 is a rear isometric view of the module of FIG. 1.
Figure 3:
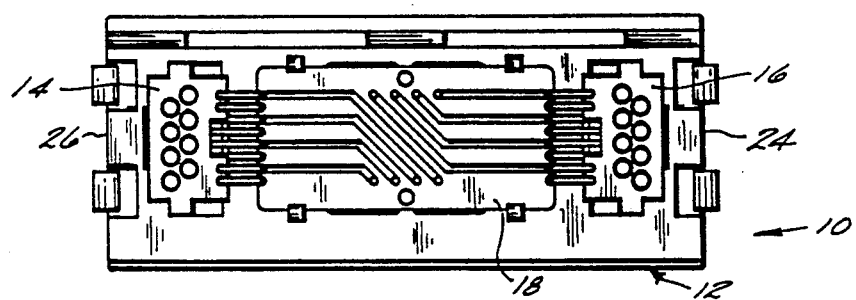
FIG. 3 is a rear elevation view of the module of FIG. 1.
Figure 4:
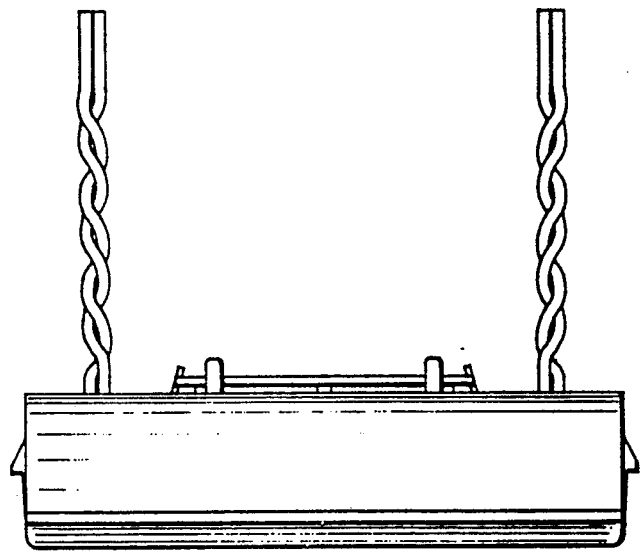
FIG. 4 is a side elevation view (shown with wire leads) of the module of FIG. 1.
Figure 5:
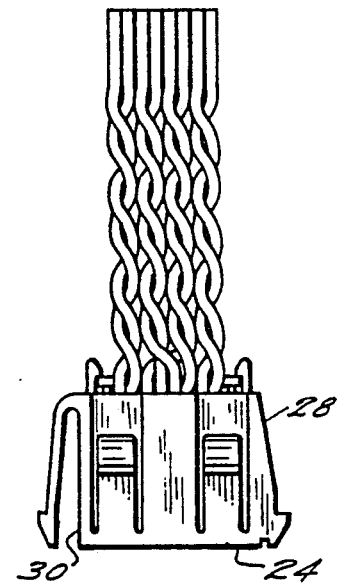
FIG. 5 is an end view (shown with wire leads) of the module of FIG. 1
Figure 6:
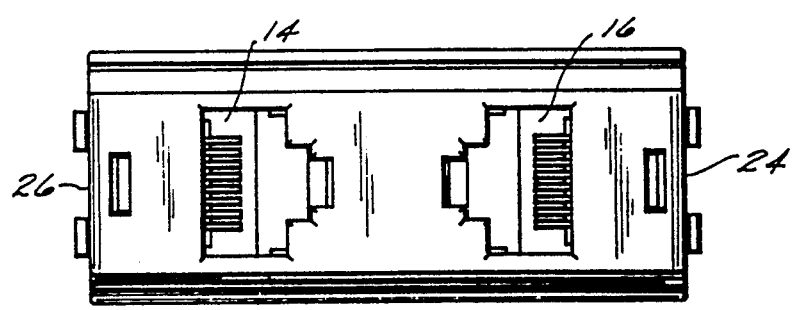
FIG. 6 is a front elevation view of the module of FIG. 1.
Figures 7A, 7B, 7C:
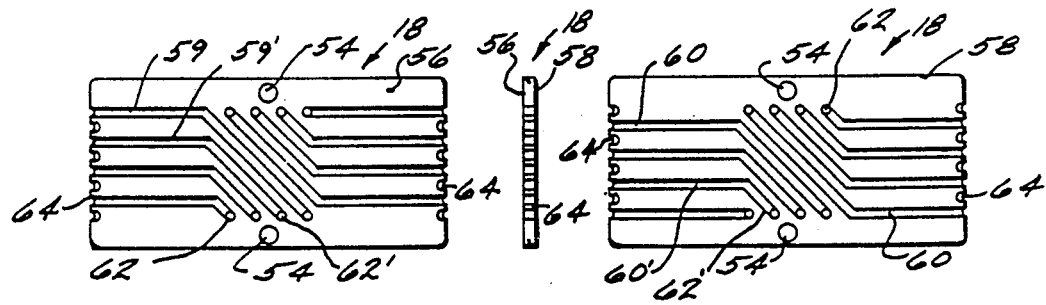
FIG. 7A-7C are front, end and rear views respectively of a circuit board used in the module of FIG. 1.
Figure 8:
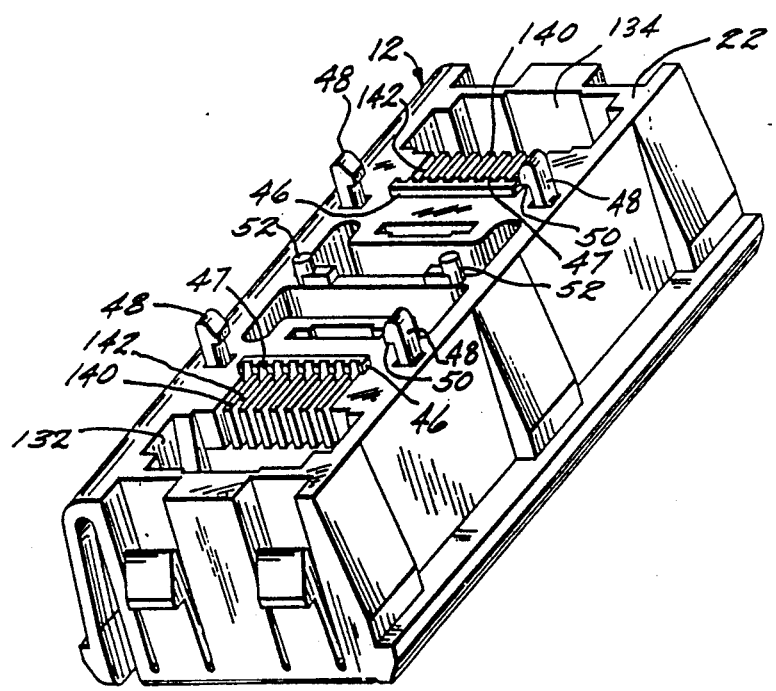
FIG. 8 is a rear perspective view, similar to FIG. 2, of a molded housing without the circuit board or jack inserts.
Figure 9:
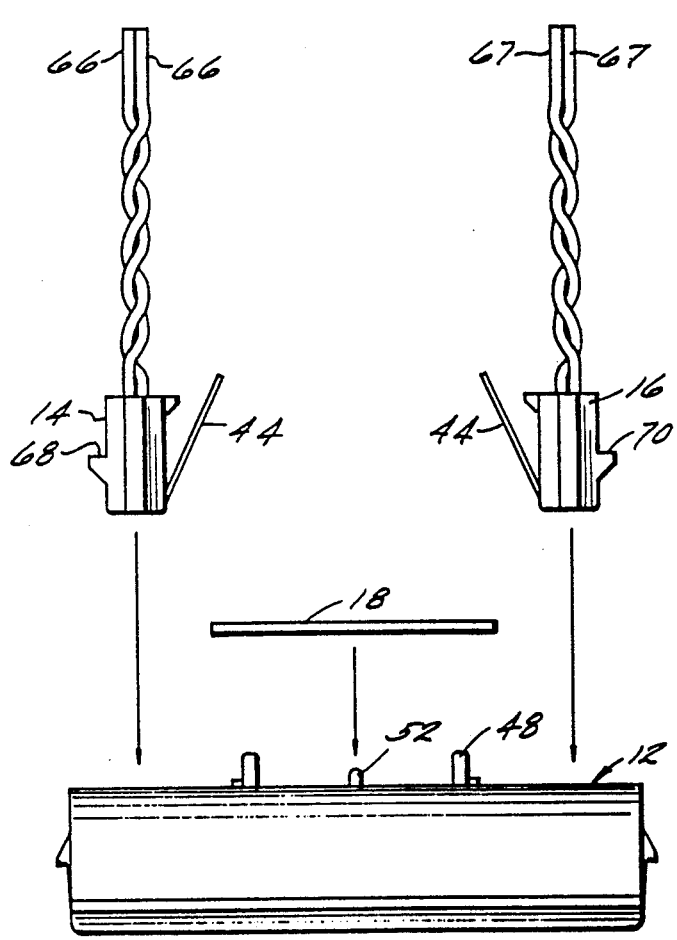
FIG. 9 is an exploded side elevation view depicting the assembly of the module of FIG. 1.
Figure 10:
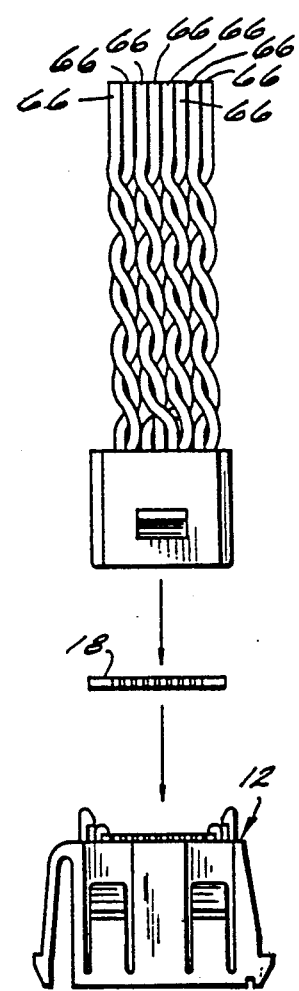
FIG. 10 is an exploded end view similar to FIG. 9.

DESCRIPTION OF THE PREFERRED EMBODIMENT:

Referring first to FIGS. 1-6, a patching module in accordance with the present invention is shown generally at 10. Module 10 includes four discrete components, namely a one-piece molded housing 12, a pair of jack inserts 14 and 16 and a printed circuit board 18. It will be appreciated that FIG. 8 depicts housing 12 prior to installation of both jack inserts 14, 16 and circuit board 18. FIGS. 7A-7C depict circuit board 18, while FIGS. 9 and 10 are side-elevation and end views respectively showing installation of jack inserts 14, 16 and circuit board 18 onto housing 12.

Housing 12 includes a front face 20, a rear face 22, a pair of end surfaces 24, 26 and a pair of side surfaces 28, 30. Front face 20 of housing 12 includes a pair of oppositely disposed openings 32, 34 which are sized and configured to receive a standard modular plug well known in the industry as a Type RJ45 modular plug. As is known, a modular plug is snap-fit in opening 32 or 34 in a conventional manner. In accordance with an important feature of the present invention, openings 32 and 34 are arranged in a back-to-back orientation which allows for a short, data worthy transmission path between jacks via the printed circuitry on circuit board 18 as will be discussed in more detail hereinafter. It will be appreciated that the term "back-to-back" means that modular telecommunications plugs inserted into openings 32 and 34 will have their respective snap-locking mechanisms in facing relationship as shown by the T-shaped portions 36 and 38 of each respective openings 32, 34, which are also in facing relationship. Finally, front face 20 also includes a pair of rectangular openings 40 and 42 in alignment with openings 32, 34 and at either end of housing 12. Openings 40, 42 are provided for the purpose of facilitating removal of jack inserts 14 and 16 for replacement or repair.

As best shown in FIG. 8, rearward surface 22 of housing 12 similarly includes openings 132, 134 which extend from rearward surface 22 to the rearside of front surface 20. Each opening 132, 134 is associated with a plurality of spaced walls 140 defining therebetween eight spaced channels 142 which are sized to receive a resilient pin 44 from jack insert 14 or 16 (see FIGS. 2 and 9). A ridge 46 extends upwardly from rearward surface 22 and runs along rearward surface 22 between all of the channels 142. Each ridge 46 includes a recess 47 transverse to the length of ridge 46 and sized and positioned to receive and support an individual resilient pin 44. Also extending upwardly from rearward surface 22 and arranged at the corners of a rectangle are four spaced latches 48. Each latch 48 includes a shoulder portion 50. It will be appreciated that the linear distance defined between each shoulder 50 and the top surface of each ridge 46 is equal to the thickness of circuit board 18 (said thickness being shown in FIG. 7B). A pair of oppositely disposed positioning tabs 52 also extend upwardly from rearward surface 22 and are disposed approximately half way between opposing pairs of latches 48. Tabs 52 are sized and positioned to receive a pair of complimentary oriented openings 54 in circuit board 18 and thereby align and position circuit board 18 on rearward surface 22 of housing 12 (see FIGS. 7A-7C).

Still referring to FIGS. 7A-7C, circuit board 18 is comprised of a suitable non-conductive substrate material such as a woven fabric impregnated with an epoxy resin. Each surface 56 and 58 of circuit board 18 includes a plurality of printed circuit traces 59, 60 respectively thereon. In the first embodiment, it will be appreciated that a circuit trace 59 on planer surface 56 is interconnected to a circuit trace 60 on planar surface 58 using a plated throughhole 62 in a known manner. For example, circuit trace 59' is interconnected to circuit trace 60' via plated throughhole 62'. The several circuit traces 59, 60 terminate at either opposed end of circuit board 18 at a semi-cylindrical groove 64 which is also plated with a conductive material. Each end surface of circuit board 18 will thus include a number of conductive grooves 64 corresponding to the number of interconnected circuit traces 58, 60, which, in turn correspond to the number of jack insert pins 44 at each end.

Figure 17A:
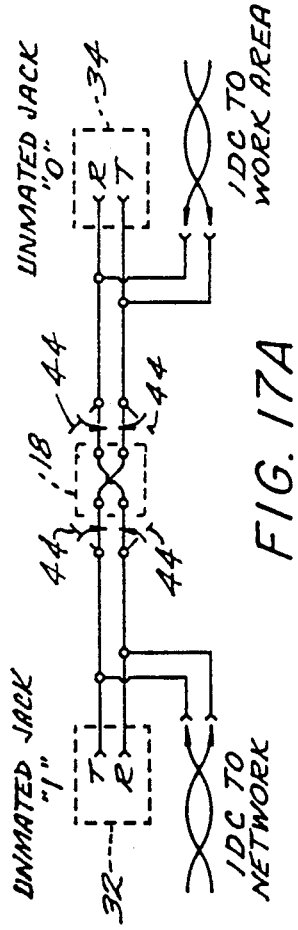
FIG. 17A is a schematic view depicting one circuit pair of the module of FIG. 1 without patch chords inserted into the jacks (jacks "O" and "I" bridged)

Turning now to FIGS. 9 and 10, circuit board 18 is shown being assembled onto housing 12. As is clear from a review of FIGS. 9 and 10, circuit board 18 is snap-fit onto latches 48 whereby tabs 52 will engage with openings 54 and position and align circuit board onto housing 12. The thustly aligned circuit board assembled to module 12 will have its circular conductive grooves 64 in alignment with both the channels 142 and recesses 47 on housing 12. This final orientation is clearly shown in FIGS. 2 and 3. Also as shown in FIGS. 9 and 10, known jack inserts 14 and 16 (such as a type 641 insert manufactured by Commtek) are easily inserted into openings 132, 134 from rearward surface 22 such that pins 44 will be received in corresponding channels 142. In the particular embodiment disclosed, jack inserts 14, 16 include eight pins 44 which are connected to eight corresponding wire leads 66 or 67. Pins 44 are formed of a spring like conductive material and are therefore resilient. Jack inserts 14 and 16 are positioned within openings 132, 134 and the shoulder 68, 70 on each respective jack insert 14, 16 are snap-locked by engagement to an interior shoulder within housing 12. Simultaneously, resilient pins 44 will be in mechanical and electrical contact with each of the cylindrical grooves 64 of circuit board 18. As a result, wire leads 66 from jack insert 14 will be electrically connected to respective wire leads 67 in jack insert 16 via conductive pins 44 and circuit traces 59, 60 on circuit board 18. Of course, interconnection between respective wire leads 66 and 67 may be changed depending upon the circuit configuration of circuit board 18. Upon insertion of a module plug into either opening 32, 34 on front face 20, the resilient conductive pins 44 will be urged outwardly towards jack insert 14 or 16 and out of contact with the circuit traces on circuit board 18 resulting in a reversible disconnection from conductive traces 59 and 60 on circuit board 18. As will be discussed in more detail hereinafter, the normal circuit configuration of patching module 10 prior to insertion of any plugs in openings 32, 34 (from front face 20) is shown in FIG. 17A.

In accordance with the present invention, a plurality of patching modules 10 are mounted on a planar panel comprised of a plurality of spaced substantially rectangular holes provided therethrough. Such mounting is achieved using a novel snap-lock mounting means which permits assembly of patching modules 10 onto a panel from either a front or rear planar surface of the panel. This is an important feature of the present invention as it permits ease of use by the end user and ease of assembly regardless of orientation of the panel. Turning again to FIGS. 1–6, side surface 30 of housing 12 includes a resilient arm member 72 which runs the length of housing 12 and is connected to end surface 30 along the intersection between end surface 30 and rearwardly facing wall 22. Arm member 72 extends upwardly and angularly outwardly from end surface 30 in a direction which diverges away from end surface 30 as is clearly shown in FIG. 1. The uppermost portions of arm member 72 include a latch which faces outwardly away from housing 12 and includes an engagement shoulder 74.

The opposite side surface 28 includes three spaced ramps 76 which diverge outwardly from rearward surface 22 towards front surface 20. Each ramp 76 terminates at a retaining shoulder 78 which runs the length of housing 12 and is in general alignment with shoulder 74 of arm 72. The upper portion of end surface 28 includes a longitudinal groove 80 for the purpose of providing a symmetrical appearance with the gap formed between wall 30 and arm 72 when assembled in a panel. Each end surface 24, 26 of housing 12 includes a pair of spaced rectangular slots 82. Extending downwardly from front face 20 and spaced outwardly from the lower surface of each slot 82 is a resilient latching means 84.

Each latching means 84 includes a latch terminating at a retaining surface 86. It will be appreciated that the linear distance between retaining surface 86 and shoulders 74, 78 is configured to accommodate the thickness of a panel such as is shown in FIGS. 11 and 12.

Referring now to FIGS. 11 and 12, the assembly of a patching module 10 onto a panel 88 will be described. FIG. 11 depicts the insertion (in a sequential manner) of a module 10 from a front surface 90 of panel 88. FIG. 12 depicts sequentially the insertion of a module 10 from rearward surface 92 of panel 88. As shown in FIG. 11, patching module 10 (shown at the far left of FIG. 11) is initially inserted through an opening 94 of panel 88 from a surface 90 thereof. Opposed sidewalls of opening 94 will thereby contact the inclined ramp structure 76 of sidewall 28 as well as the outwardly diverging resilient arm 72 which extends from sidewall 30. As module (now denoted at 10') is urged in a downward direction, ramps 76 will urge resilient arm 72 inwardly towards side surface 30 rotating arm 72 counter clockwise with respect to surface 30. Simultaneously, the four resilient latch means 84 on either end surface 24, 26 of module 10' will be urged inwardly within each respective rectangular channel 82. Finally, as denoted by the reference numeral 10", when each retaining shoulder 74 and 78 is engaged to surface 90 of panel 88, latching means 84 will snap back outwardly from respective channels 82 and retaining edges 86 will engage to rear planar surface 92 of panel 88. As a result, module 10" is retained firmly within opening 94 of panel 88.

Similarly, in FIG. 12, module 10 (shown at the far left of the FIGURE) is angularly positioned within opening 94 such that shoulder 78 engages the front surface 90 of panel 88. Using the intersection of front surface 90 and opening 94 as a pivot point, module 10 is then pivoted upwardly until rear surface 92 of panel 88 engages the inclined edge 96 adjacent to shoulder 74. Thereafter, as shown at 10', the module is urged upwardly so that resilient arm 72 pivots inwardly towards sidewall 30 until at maximum deflection, the gap between sidewall 30 and arm 72 closes. As the module (shown at 10") is continually pushed upwardly shoulders 74 and 78 contact front surface 90 of panel 88. At that point, arm 72 will spring outwardly as shown. Also, the four latching means 84 will engage the rear surface 92 of panel 88 as was described with regard to FIG. 11. It will be understood that in a manner similar to that described in FIGS. 11 and 12, patch module 12 may be removed from either front surface 90 or rear surface 92 by defeating end latches 84 or arm 72 respectively to facilitate changes or repair.

Figure 13:
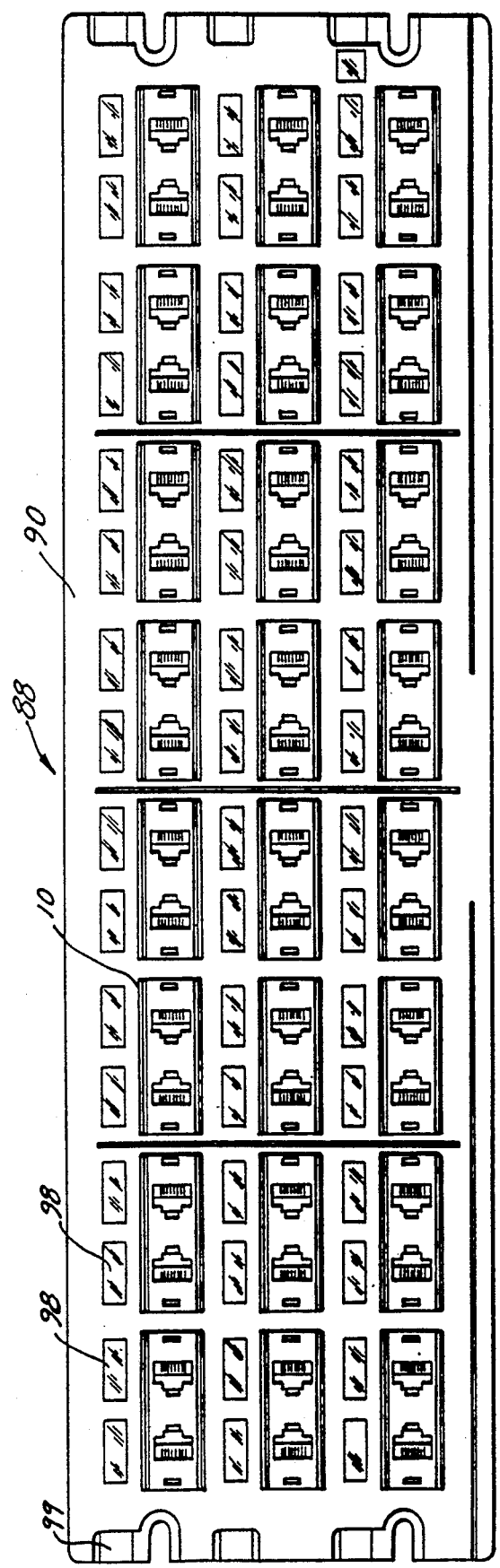
FIG. 13 is a front elevation view of a fully assembled panel housing a plurality of modules of the type shown in FIG. 1.

A front view of a fully assembled panel 88 is shown in FIG. 13. In this particular embodiment, panel 88 includes twenty-four openings 94 for receiving a field of twenty-four spaced modules 10. The front surface 90 of panel 10 includes designation means 98 which are positioned above each jack opening of each module 10. Thus, there are two designation means 98 for each of the twenty-four modules 10 for a total of forty-eight designating spaces. Preferably, each designation means 98 comprises a plastic laminate of clear rectangular viewing windows that are in alignment with a channel between the rear of the plastic cover plate and the front of the panel surface; and which is edged on three sides by an adhesive with sufficient thickness to allow entry and removal of a thin designation strip 99 of either paper or Mylar from receptacles at each end of the panel.

Figure 14:
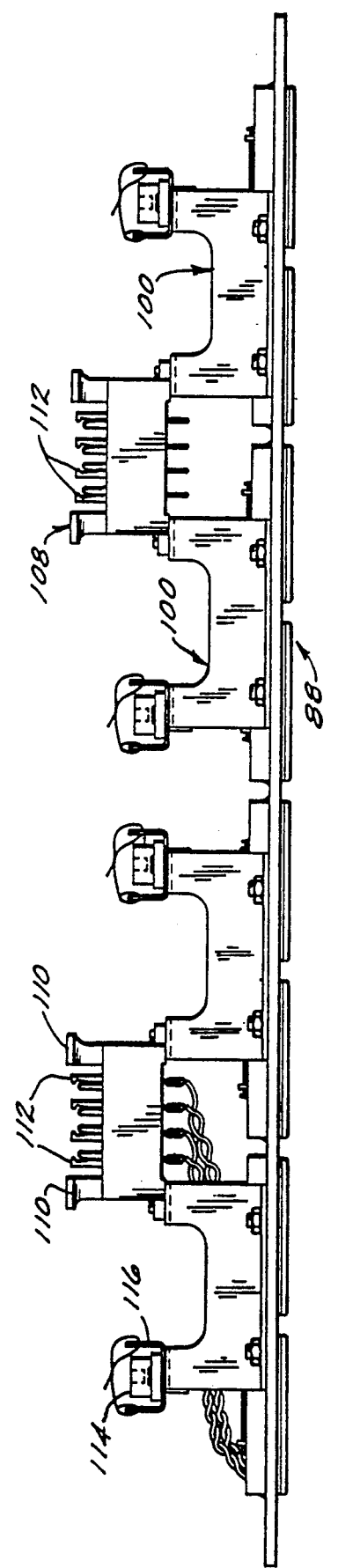
FIG. 14 is a partially wired side elevation view of the panel of FIG. 13.
Figure 15:
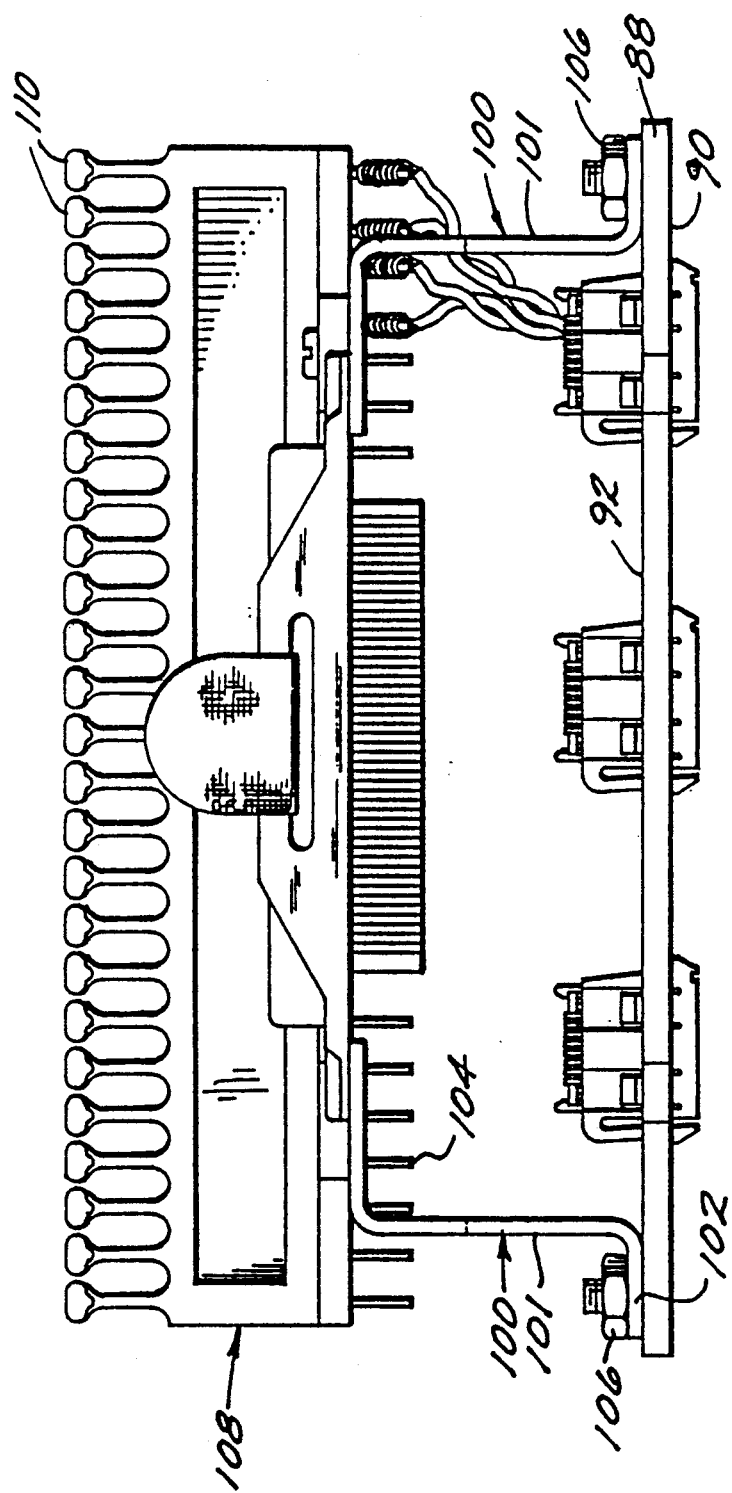
FIG. 15 is a partially wired end elevation view of the panel of FIG. 13
Figure 16:
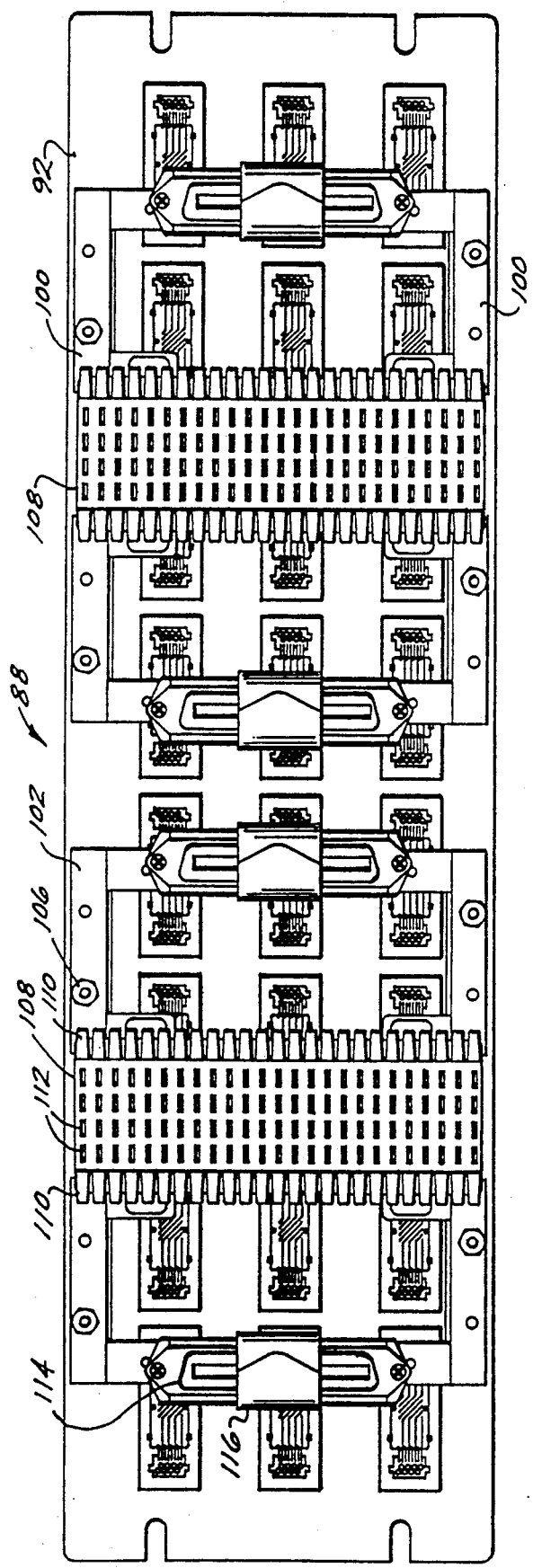
FIG. 16 is a rear elevation view of the panel of FIG. 13 (wire leads not shown)

FIGS. 14, 15 and 16 are side, end and rear views respectively, of the fully assembled panel 88 of FIG. 13. Rear face 92 of panel 88 includes a plurality of S-shaped mounting brackets 100 which comprise a wall 101 and a pair of oppositely extending flanges 102 and 104 transverse to the wall. Flange 102 is mounted onto panel 88 using suitable fastening means 106. Pairs of adjacent flanges 104 support a known terminal block 108 which includes a fanning strip 110 and a plurality of spaced terminals 112 arranged in columns and rows. Preferably, terminals 112 are comprised of known "66-type" terminals which have wire wrap pins extending downwardly therefrom as best shown in FIG. 14. Type-66 terminal blocks such as is shown at 108 in FIGS. 14–16 are well known and disclosed in more detail in U.S. Pat. No. Re-Issue 31,714 which is owned by the assignee hereof and fully incorporated herein by reference. As best shown in FIGS. 14 and 15, wire leads 66 and 67 extending from inserts 14 and 16 of patching module 12 are connected to the terminals 112 by known wire wrapping methods. Selected flanges 104 also support known unitary connectors 114 (such as 25 pair telco type connectors. Preferably, a connector hold-down 116 such as described in U.S. Pat. Nos. 4,343,525, 4,463,999 and 4,702,540, all of which are assigned to the assignee hereof, is associated with each unitary connector.

As is clear from a review of FIGS. 14–16, the fully assembled panel 88 allows for mounting either twenty-five pair Telco connectors 114 or insulation displacement connector (IDC) type connecting blocks 108 or both so as to accommodate connecting patch modules to different equipment or cables. Blocks 108 may either be mounted between a pair of mounting brackets 100 as shown in FIG. 16 or alternatively, a connecting block 108 may be mounted directly on a mounting bracket 100. Of course in this latter case, on of the Telco connectors 114 would be removed to allow space for positioning of connecting block 108. The use of the mounting brackets 100 on the back surface 92 of panel 88 provides for easy access for both module mounting positions and for easy field servicing.

Figure 17B:
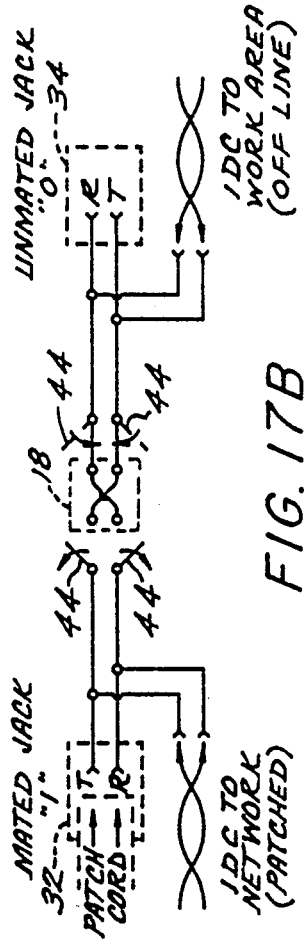
FIG. 17B is an electrical schematic of the module of FIG. 1 with a single patch chord inserted (jack "I" rerouted; jack "O" disconnected)
Figure 17C:
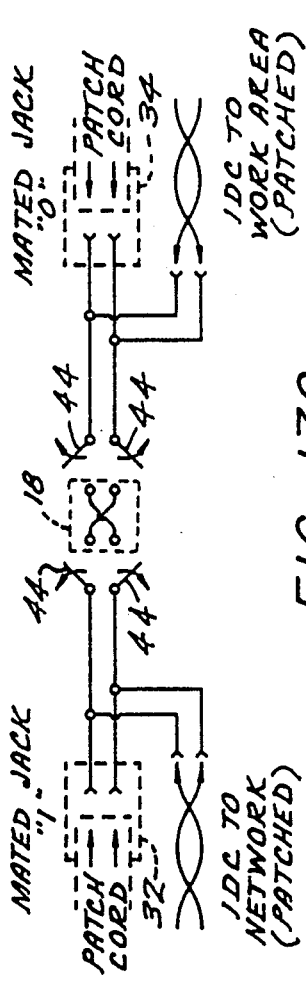
FIG. 17C is an electrical schematic of the module of FIG. 1 with a pair of patch chords inserted therein (jacks "O" and "I" both rerouted)

Referring now to FIGS. 17A–C, two conductor wiring diagrams depicting the dual pre-emptive patch system of the present invention is shown. In FIG. 17A, the wiring diagram is shown for two circuits in a single module 10 wherein both jacks 32 and 34 are unmated and therefore pins 44 are in contact with the printed circuitry on circuit board 18. In this case, each module 10 acts as a bridge for up to eight circuits between for example, terminals 112 from a connector block 108 and a Telco connector 14 such as shown in FIG. 16. In a telecommunications application, each module 10 may act as an interconnector bridge between a telecommunications network (on the right) and a working area (on the left) as in FIG. 17A.

Turning now to FIG. 17B, a patch cord with known plug terminations as described in U.S. Pat. Nos. 4,626,057, 4,682,837 and D292,794 all of which are assigned to the assignee hereof, has been inserted into jack opening 32. Upon connection of patch cord with jack 32, the modular plug at the end of the patch cord will urge pins 44 outwardly out of contact with the circuitry on circuit board 18 and thereby interrupt the connection as shown. In that way, the patch cord will have overrode the bridge connection and therefore FIG. 17B depicts a patched state whereupon the network connections have been rerouted and work area wiring disconnected.

In FIG. 17C, a second patch cord has been inserted into jack 34 thereby urging pins outwardly from circuit board 18 resulting in a fully rerouted connections on both the network side and the work area. FIG. 17C thus depicts the wiring diagram wherein the patch cords act to reconfigure connections from jacks 32 and 34 to work area and network nodes connected to other equipment, connectors or patch modules. It should be noted that, changes to patched connections as shown in FIGS. 17B and 17C results in the disconnection of shunt circuitry associated with circuit board 18, thus eliminating any negative effects that the circuit board or associated connections may otherwise have on data transmission with patch cords attached.

Figure 18:
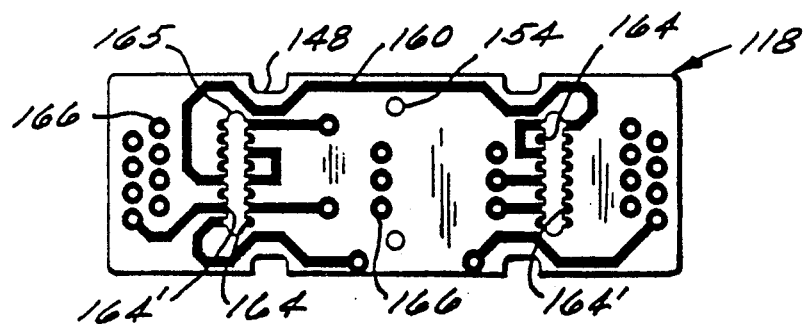
FIG. 18 is a front elevation view of an alternate embodiment of a circuit board that may be used with the molded housing of FIG. 8.

While a preferred embodiment is shown in FIGS. 1-17, it should be appreciated that the technique taught by the present invention provides advantages that may be applied to a wide variety of circuit configurations. These alternate embodiments offer substantial benefits in the wiring of telecommunications networks over prior art patching systems. For example, referring now to FIGS. 18, 19 and 20, an alternate circuit board and patch module is shown for an application requiring circuit elements, insert lead connections and switching capabilities beyond that of the first embodiment. FIG. 18 shows a circuit board 118, for assembly to a molded housing 10. Circuit board 118 is shown with notches 148 for engagement of module latches 48 and locating holes 154 to act as alignment means when engaged with pins 52 of molded housing 10. Elongated apertures 165 with opposing grooved contact surfaces 164, 164' allow for interruptable connections with jack contacts 44 and are provided on circuit board 118 as are circuit traces 160 and solder pads 166 for the connection of circuit elements and connector pins.

Figure 19:
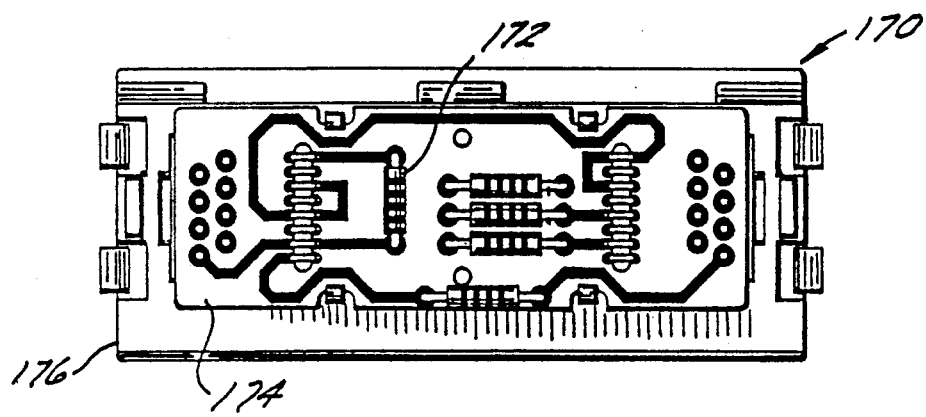
FIG. 19 is a rear elevation view of an alternate embodiment of the module shown in FIG. 6 incorporating the circuit board of FIG. 18.
Figure 20:
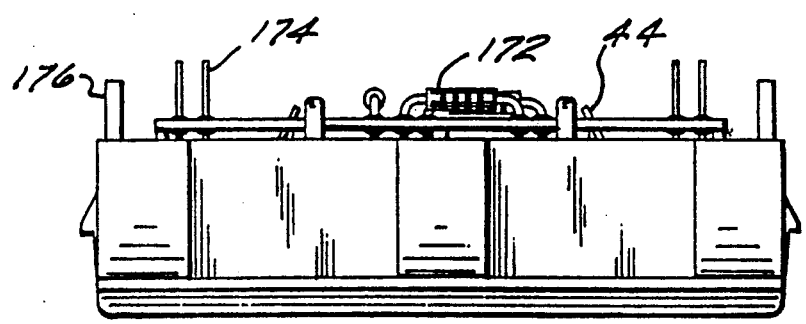
FIG. 20 is a side elevation view of the module of FIG. 19.

FIGS. 19 and 20 show rear and side views respectively of a fully assembled patch module 170 with electronic circuit components 172 (such as transistors, resistors, diodes or the like), rigid insert leads 174, and stand off legs 176. The alternate embodiment shown in FIG. 19 shows interruptable and non interruptable connections to jack contacts 44 and insert pins 174 respectively. As described for the earlier embodiment, it will be appreciated that jack contacts 44 and insert pins 174 are electrically continuous and, in this embodiment, may represent two ends of a unitary formed lead. In their normal state, without a modular plug installed, jack contacts 44 maintain constant pressure on conductive grooved surfaces 164 of circuit board 118. When a known modular plug is inserted in jack opening 32 or 34 of FIGS. 1 and 6, respective jack contacts 44 are urged outwardly from conductive surfaces 164 and towards opposing grooved conductive surfaces 164'. Complete engagement of the plug results in pins 44 having sufficient contact pressure on conductive surfaces 164' to maintain constant electrical connection, thereby reversibly altering the circuit configuration of patch module 170. Patch module 170 also shows various circuit connection options such as intra as well as inter-jack bridging. Rigid, insert rods or pins 174 or other leads connected to circuit board 118 and stand off legs 176 are constructed to allow mounting and attachment to a second circuit board for connection to other circuit elements, patch modules or connectors.

Figure 21:
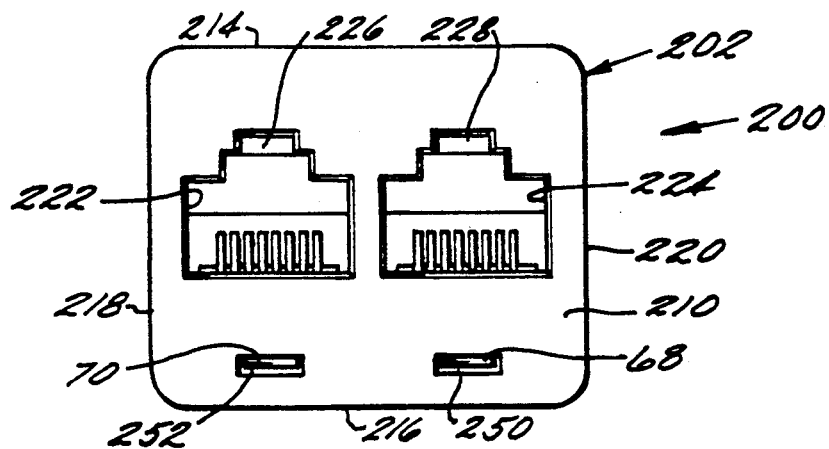
FIG. 21 is a front elevation view of a dual pre-emptive jack module (shown without wire leads) in accordance with an alternate embodiment of the present invention.
Figure 22:
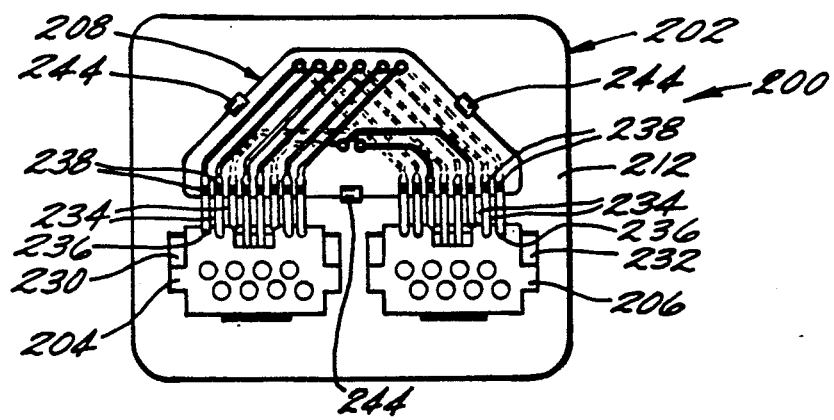
FIG. 22 is a rear elevation view of the module of FIG. 21.
Figure 23:
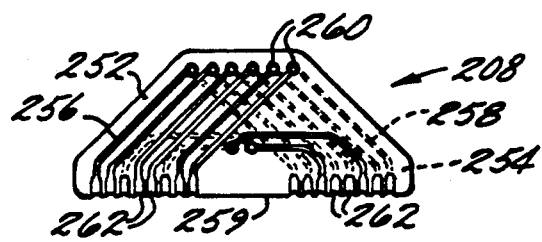
FIG. 23 is a top plan view of a circuit board for use in the embodiment of FIG. 21.

Referring now to FIGS. 21-23, a patching module in accordance with an alternate embodiment of the present invention is shown generally at 200. Module 200 differs from module 10 primarily in the orientation of the module jacks and the circuit board configuration. Unlike the "back-to-back" modular jack orientation of module 10, modular jacks 222, 224 in module 200 are oriented in a side-by-side configuration. This results in a printed circuit board 208 configuration (best shown in FIG. 23) wherein all of the circuit trace terminations are in alignment along the same side of the board. In substantially all other respects, module 200 is the same as module 10. Accordingly, module 200 includes four discrete components, namely a one-piece molded housing 202, a pair of jack inserts 204, 206 and a printed circuit board 208. It will be appreciated that the outer structure of module 200 and its interaction with a panel such as panel 88 (in FIG. 13) is the same as in module 10.

Housing 202 includes a front face 210, a rear face 212, a pair of end surfaces 214, 216 and a pair of side surfaces 218, 220. Front face 210 of housing 202 includes a pair of modular jack openings 222, 224 which are sized and configured to receive a standard modular plug well known in the industry as a Type RJ45 modular plug. As is known, a modular plug is snap-fit in opening 222 or 224 in a conventional manner. In accordance with an important feature of the present invention, openings 222 and 224 are arranged in a side-by-side orientation which allows for a short, data worthy transmission path between jacks via the printed circuitry on circuit board 208 as will be discussed in more detail hereinafter. It will be appreciated that the term "side-by-side" means that modular telecommunications plugs inserted into openings 222 and 224 will have their respective snap-locking mechanisms facing in the same direction as shown by the T-shaped portions 226 and 228 of each respective openings 222, 224, which are also facing in the same direction.

As best shown in FIG. 22, rearward surface 212 of housing 202 similarly includes openings 230, 232 which extend from rearward surface 212 to the rearside of front surface 210. Each opening 230, 232 is associated with a plurality of spaced walls 234 defining therebetween eight spaced channels 236 which are sized to receive a resilient pin 238 from jack insert 204 or 206. Extending upwardly from rearward surface 212 are three spaced latches 244 for retaining circuit board 208 to rear surface 212. Rear surface 212 also includes a ridge functionally analogous to ridge 46 in the previous embodiment as well as a functionally equivalent tab 52.

Referring to FIGS. 22 and 23, circuit board 208 is comprised of a suitable non-conductive substrate material such as a woven fabric impregnated with an epoxy resin. Each surface 252 and 254 of circuit board 208 includes a plurality of printed circuit traces 256, 258 respectively thereon. It will be appreciated that a circuit trace 256 on planar surface 252 is interconnected to a circuit trace 258 on planar surface 254 using a plated throughole 260 in a known manner. Unlike the generally rectangularly shaped circuit board 18 of FIGS. 7A–C, circuit board 208 has a truncated, generally triangular shape. The several circuit traces 256, 258 terminate along a common side 259 of circuit board 208 at a semi-cylindrical groove 262 which is also plated with a conductive material. Edge surface 259 of circuit board 208 thus includes a number of conductive grooves 262 corresponding to the number of interconnected circuit traces 256, 258, which, in turn corresponds to the total number of jack insert pins 238.

As is clear from a review of FIG. 22, circuit board 208 is snap-fit onto latches 244. The circuit board assembled to module 202 will have its circular conductive grooves 262 in alignment with channels 236 of housing 202. Known jack inserts 204 and 206 (being the same as inserts 14 and 16 in the first embodiment) are easily inserted into openings 230, 232 from rearward surface 212 such that pins 238 will be received in corresponding channels 236. Pins 238 are connected to corresponding wire leads. Jack inserts 204 and 206 are positioned within openings 230, 232 and a shoulder 68, 70 of the previous embodiment on each respective jack insert 204, 206 are snap-locked by engagement to a corresponding interior shoulder 250 or 252 within housing 202. Simultaneously, resilient pins 238 will be in mechanical and electrical contact with each of the cylindrical grooves 262 of circuit board 208. As a result, wire leads from jack insert 204 will be electrically connected to respective wire leads in jack insert 206 via conductive pins 238 and circuit traces 256, 258 on circuit board 208. Upon insertion of a module plug into either opening 222, 224 on front face 210, the resilient conductive pins 238 will be urged outwardly towards jack insert 204 or 206 and out of contact with the circuit traces on circuit board 208 resulting in a reversible disconnection from conductive traces 256 and 258 on circuit board 208.

Figure 24:
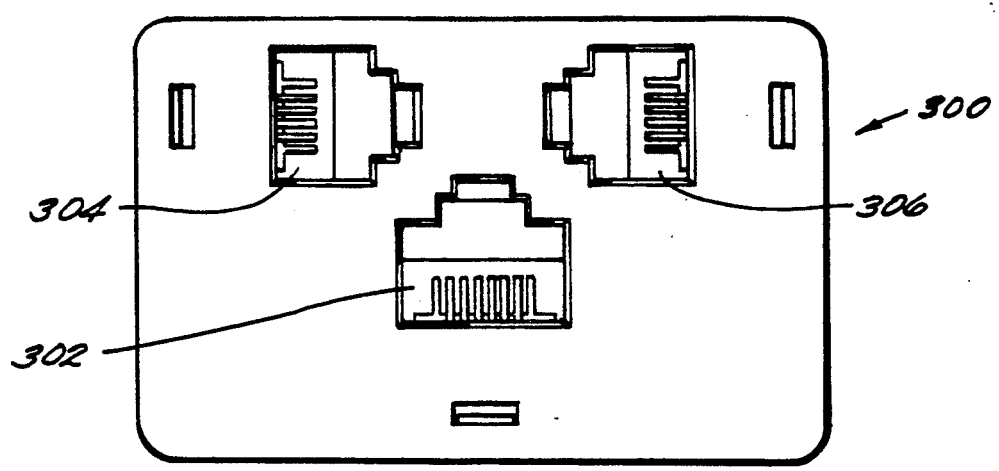
FIG. 24 is a front elevation view of still another embodiment of a dual pre-emptive jack module in accordance with the present invention.
Figure 25:
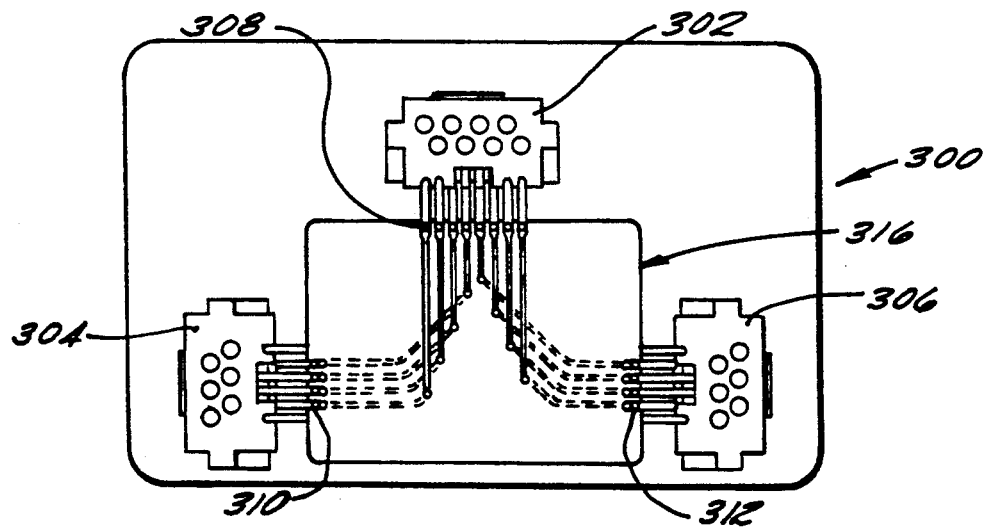
FIG. 25 is a rear elevation view of the module of FIG. 24.

In accordance with still another embodiment, of the present invention shown generally at 300 in FIGS. 24 and 25, three modular jacks 302, 304 and 306 are positioned at an angle to one another and preferably at a 90 degree angle. In other words, the snap locking mechanisms for jacks 302, 304 and 306 are at right angles to each other. As in the previously described embodiments, contact pins 308, 310 and 312 in respective modular jacks 302, 304 and 306 are selectively disconnected (by insertion of a modular plug as discussed above) from circuit traces 314 on a circuit board 316. The circuit traces 314 terminate at adjacent sides 318, 320 and 322 of circuit board 316. This configuration is in contrast to the embodiment of FIGS. 7A–C where the circuit traces terminate at opposing sides of the circuit board; and the embodiment of FIG. 22 where the circuit traces terminate along a common side of the circuit board.

In all other respects, the module 300 is the same as the previously discussed embodiments of modules 10 and 200.

Figure 26:
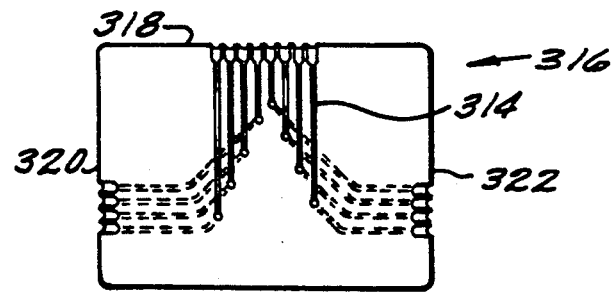
FIG. 26 is a top plan view of a circuit board for use in the embodiment of FIG. 24.
Figure 27:
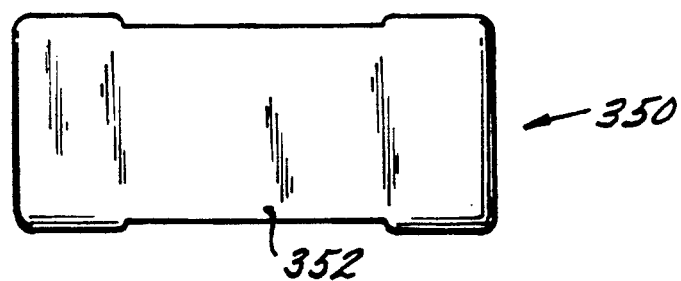
FIG. 27 is a front elevation view of a protective cover for use with the dual pre-emptive jack module in accordance with the present invention.
Figure 29:
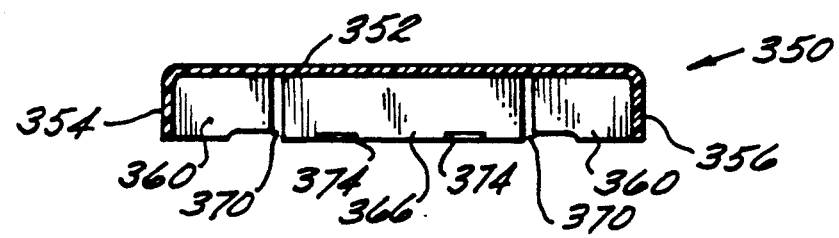
FIG. 29 is a cross-sectional elevation view along the line 29—29 of FIG. 28.
Figure 28:
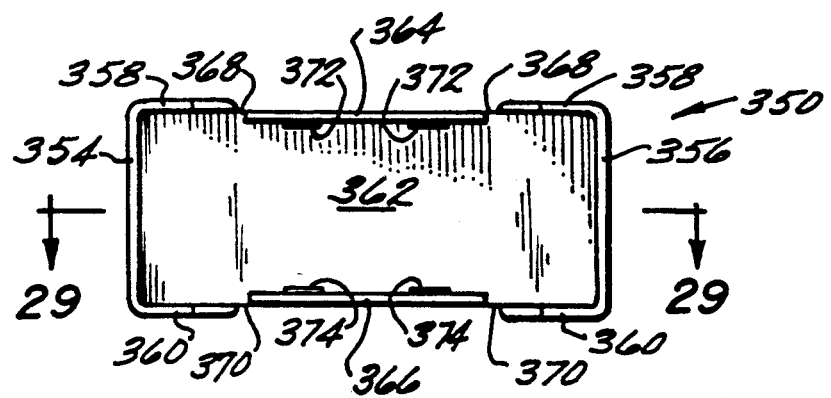
FIG. 28 is a rear elevation view of the cover of FIG. 27.

In the FIGS. 24–26 embodiment, one eight position modular jack 302 communicates with two four position modular jacks 304, 306. Of course, any number of modular jacks (e.g., two or four) as well as any size modular jack (e.g., two, four, six or eight position) may be used with this embodiment.

Turning now to FIGS. 27–30, a cover for providing a protective housing to rear surface 22 of module 10 (or alternatively module 200 or 300) is shown generally at 350. Cover 350 includes a front planar surface 352 generally in the shape of a capital "I". Planar surface 352 includes two opposed depending end walls 354, 356 and two opposed depending side walls 358, 360 to define therein an open cavity 362. Each side wall 358, 360 is interrupted (at the center thereof), by a rectangular plate 364, 366 which is parallel to a respective sidewall, but displaced therefrom by a thickness about equal to the thickness of a sidewall. A pair of slots 368 separates plate 364 from sidewall 358; and a pair of slots 370 separates plate 366 from sidewall 360. Each plates 364, 366 includes a pair of ridges 372, 374 extending laterally therefrom.

Slots 368, 370 are spaced to align and cooperate with the four latches 48 (which retain circuit board 18). Each plate 364, 366 is sized to fit between a pair of coplanar latches 48; while sidewalls 358, 360 form a friction fit with the latches 48. When cover 350 is fully disposed over latches 48 in this manner, ridges 372, 374 effect a snap fit attachment to printed circuit board 18 thereby firmly retaining cover 350 onto the back side of module 10.

Figure 30:
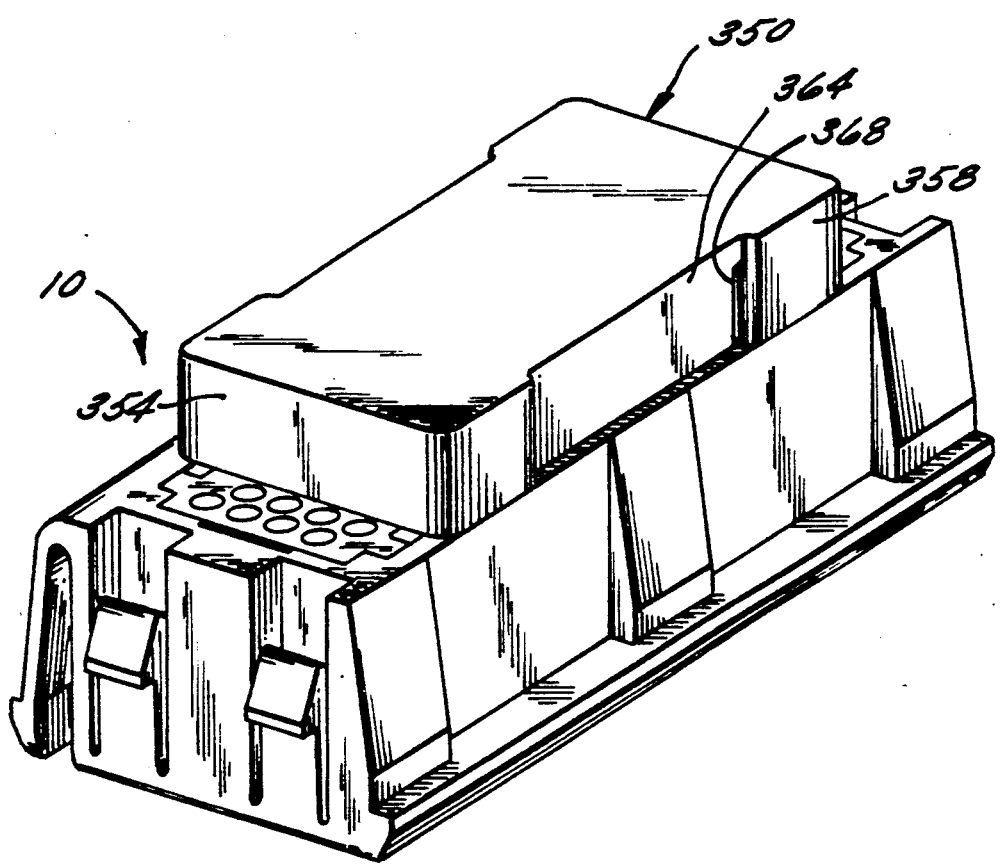
FIG. 30 is a front isometric view of a dual preemptive jack module having the cover of FIG. 27 attached thereto.

The fully assembled cover/module is shown in FIG. 30. It will be appreciated that cover 350 is important in providing a protective enclosure to the circuit board 18 and pins 44.

By providing a pair of integral modular jack interfaces with defeatable, internal patch connections, the present invention provides a degree of functionality and flexibility that allows it to overcome many limitations of prior art patching hardware. First, its ability to reversibly reconfigure more than two circuit paths while maintaining electrical isolation between adjacent circuits before, during and after engagement of plug connectors allows it to emulate the many electrical circuit configurations of Bantam jack connectors with a more versatile, cost effective and space efficient modular interface. The close physical relation between input and output ports allows for a unitary jack field without patch cords until connection paths must be rerouted. This approach provides an orderly installation with inherent administration ease and transmission integrity by the reduction of transmission length and the number of connection points required for conventional patching. The elimination of patch cords except to administer moves or changes also improves installation appearance and reduces the likelihood or disturbing electrical connections of other circuits through inadvertent movement of nearby patch cords. Crosstalk noise, as a result of closely grouped patch cords in cable raceways between patch fields is also reduced.

It will be appreciated that while the present invention has been shown in conjunction with an eight conductor modular jack and associated circuitry, this invention is equally applicable to any number of wire pairs such as 2, 4 or 6 pair jacks. Also, the printed circuitry on printed circuit board, 18, 108, 208 and 312 may be changed to accommodate any combination of inter and intra jack bussing and circuit configurations. Similarly, the insert wires may be replaced with straight solder pins and end latches may be extended for circuit board mounting if desired. Both the modular jack configuration and the modular plug for insertion therein may also have any other desired configuration or style. Also, more than two modular jack interfaces may be provided per patch module.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A patching module comprising:
   a housing having a front face opposed from a rear face, a first side opposed from a second side and a first end opposed from a second end;
   a pair of first and second openings through said housing between said front face and said rear face;
   a first modular jack in said first opening, said first jack including a plurality of first resilient contact pins extending angularly and outwardly therefrom, said first pins being electrically connected to a corresponding plurality of first leads extending from said first jack;
   a second modular jack in said second opening, said second jack including a plurality of second resilient contact pins extending angularly and outwardly therefrom, said second pins being electrically connected to a corresponding plurality of second leads extending from said second jack;
   circuit means having circuitry on at least a first surface thereof, said circuit means being retained on said rear face of said housing with said first contact pins normally being in electrical and mechanical contact with said circuitry and said second contact pins normally being in electrical and mechanical contact with said circuitry so that said circuitry electrically interconnects said first pins to said second pins; and
   wherein said first pins are urged out of electrical and mechanical contact with said circuitry when a modular plug is inserted into said first opening from said front face and said second pins are urged out of electrical and mechanical contact with said circuitry when a modular plug is inserted into said second opening from said front face.

2. The module of claim 1 including:
   a plurality of spaced walls adjacent each of said first and second openings, said spaced walls defining therebetween channels for receiving said respective first and second pins.

3. The module of claim 2 including:
   a pair of ridges extending upwardly from said rear face, each of said ridges being transverse to said plurality of spaced walls with said respective first and second pins being supported by a respective ridge.

4. The module of claim 3 including:
   a plurality of spaced recesses in each of said ridges, one each of said recesses supporting one each of said first or second pins.

5. The module of claim 1 wherein:
   said first modular jack comprises a first insert; and
   said second modular jack comprises a second insert.

6. The module of claim 5 wherein:
   said first insert is insertable into said first opening from said rear face; and
   said second insert is insertable into said second opening from said rear face.

7. The module of claim 1 wherein:
   said first and second openings are aligned.

8. The module of claim 1 wherein:
   said first and second openings are respectively oriented to orient said first and second modular jacks in a "side-by-side" orientation.

9. The module of claim 8 wherein said circuit means includes sides and wherein:
   said circuitry terminates along a common side of said circuit means.

10. The module of claim 1 wherein said circuit means includes sides and wherein:
    said circuitry terminates along a common side of said circuit means.

11. The module of claim 1 wherein:
    said first and second openings are respectively oriented to orient said first and second modular jacks at an angle with respect to each other.

12. The module of claim 11 wherein:
    said angle comprises about 90 degrees.

13. The module of claim 11 wherein said circuit means includes sides and wherein:
    said circuitry terminates along at least two of said sides, said two sides being angularly offset from each other.

14. The module of claim 13 wherein:
    said angular offset comprises about 90 degrees.

15. The module of claim 1 wherein said circuit means includes sides and wherein:
    said circuitry terminates along at least two of said sides, said two sides being angularly offset from each other.

16. The module of claim 15 wherein:
    said angular offset comprises about 90 degrees.

17. The module of claim 1 including:
    retaining means on said rear face for retaining said circuit means.

18. The module of claim 17 wherein said retaining means comprise:
    a plurality of spaced latches extending upwardly from said rear face.

19. The module of claim 1 wherein:
    said circuit means comprises a circuit board.

20. The module of claim 11 wherein said circuit board includes:
    a plurality of spaced grooves, each of said grooves receiving and supporting one of said first or second pins.

21. The module of claim 1 including attaching means for snap-locking a module into an opening in a panel.

22. The module of claim 21 wherein said attaching means comprises:
    a first resilient arm diverging outwardly from said first side of said housing, said arm being connected to said first side near said rear face, said first arm including a first longitudinal retaining shoulder;
    ramp means on said second side of said housing and diverging outwardly from said second side of said housing between said rear face and toward said front face; and
    a second longitudinal retaining shoulder along said second side.

23. The module of claim 22 wherein:

said first and second shoulders are co-planar when the module is snaplocked into an opening in a panel.

24. The module of claim 22 including:
at least one first channel in said first end;
first resilient latch means in said first channel;
at least one second channel in said second end; and
second resilient latch means in said second channel.

25. The module of claim 24 wherein:
said first and second latch means extend downwardly from said front face toward said rear face and are spaced from a bottom surface of said respective first and second channels.

26. The module of claim 24 wherein:
each of said first and second latch means includes a retaining surface transverse to said latch means and wherein the distance between said retaining surfaces and said first and second shoulders is about equal to the thickness of a panel.

27. The module of claim 19 including:
at least one electronic circuit component on said circuit board, said component being electrically connected to said circuitry.

28. The module of claim 1 wherein said first and second leads comprise:
rigid rods extending outwardly from said first or second modular jack or wire conductors.

29. The module of claim 1 including:
a third opening through said housing between said front face and said rear face;
a third modular jack in said third opening, said third jack including a plurality of third resilient contact pins extending angularly and outwardly therefrom, said third pins being electrically connected to a corresponding plurality of third leads extending from said third jack;
said third contact pins normally being in electrical and mechanical contact with said circuitry so that said circuitry electrically interconnects said third pins to at least said first pins; and
wherein said third pins are urged out of electrical and mechanical contact with said circuitry when a modular plug is inserted into said third opening from said front face.

30. The module of claim 29 wherein:
said first, second and third openings are respectively oriented to orient said first, second and third modular jacks at an angle with respect to each other.

31. The module of claim 30 wherein:
said angle comprises about 90 degrees between said first and second jacks and between said first and third jacks.

32. The module of claim 30 wherein said circuit means includes sides and wherein:
said circuitry terminates along at least three of said sides, said three sides being angularly offset from each other.

33. The module of claim 29 wherein:
said first modular jack comprises an eight position jack; and
said second and third modular jacks comprises four position modular jacks.

34. The module of claim 1 wherein:
said circuit means includes an outer periphery and said circuitry terminates at said outer periphery of said circuit means.

35. The module of claim 1 wherein:
said circuit means includes a plurality of interior grooves which receive said first and second contact pins; and wherein
said circuitry terminates at at least some of said grooves.

36. The module of claim 35 wherein:
at least one of said interior grooves includes opposed first and second ends with said first end communicating with a first circuit trace and said second end communicating with a second circuit trace, wherein said first or second contact pin is switchable between said first circuit trace and said second circuit trace.

37. The module of claim 1 including:
detachable cover means for covering said circuit means.

38. The module of claim 37 wherein said cover means comprises:
a housing having a front surface, opposed depending end surfaces and opposed depending side surfaces;
a pair of opposed plates, each of said plates being parallel to, and spaced inwardly from a respective side surface with a slot separating opposed ends of each plate from a respective side surface.

39. The module of claim 38 wherein:
each of said plates includes at least one laterally extending ridge.

40. A modular jack patch panel comprising:
a panel having a plurality of openings therein, at least one of said openings including a module therein; and
wherein said module comprises;
a housing having a front face opposed from a rear face, a first side opposed from a second side and a first end opposed from a second end;
a pair of first and second openings through said housing between said front face and said rear face;
a first modular jack in said first opening, said first jack including a plurality of first resilient contact pins extending angularly and outwardly therefrom, said first pins being electrically connected to a corresponding plurality of first leads extending from said first jack;
a second modular jack in said second opening, said second jack including a plurality of second resilient contact pins extending angularly and outwardly therefrom, said second pins being electrically connected to a corresponding plurality of second leads extending from said second jack;
circuit means having circuitry on at least a first surface thereof, said circuit means being retained on said rear face of said housing with said first contact pins normally being in electrical and mechanical contact with said circuitry and said second contact pins normally being in electrical and mechanical contact with said circuitry so that said circuitry electrically interconnects said first pins to said second pins; and
wherein said first pins are urged out of electrical and mechanical contact with said circuitry when a modular plug is inserted into said first opening from said front face and said second pins are urged out of electrical and mechanical contact with said circuitry when a modular plug is inserted into said second opening from said front face.

41. The patch panel of claim 40 wherein said panel has a front face and a rear face and including:
bracket means extending from said rear face; and discrete connector means attached to said bracket, said connector means being electrically connected to said first or second wire leads of said first or second jacks.

42. The patch panel of claim 41 wherein:
said discrete connector means comprises at least one insulation displacement terminal block.

43. The patch panel of claim 41 wherein:
said discrete connector means comprises at least one telco connector.

* * * * *